United States Patent
Zhang et al.

(10) Patent No.: US 8,521,959 B2
(45) Date of Patent: Aug. 27, 2013

(54) METHOD AND DEVICE FOR RECOVERING DESCRIPTION INFORMATION, AND METHOD AND DEVICE FOR CACHING DATA IN DATABASE

(71) Applicant: Huawei Technologies Co., Ltd., Guangdong (CN)

(72) Inventors: Zhenlong Zhang, Hangzhou (CN); Shuai Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 13/622,139

(22) Filed: Sep. 18, 2012

(65) Prior Publication Data

US 2013/0166845 A1    Jun. 27, 2013

Related U.S. Application Data

(63) Continuation of application No. PCT/CN2012/075852, filed on May 22, 2012.

(30) Foreign Application Priority Data

Dec. 21, 2011    (CN) .......................... 2011 1 0433019

(51) Int. Cl.
*G06F 12/16*    (2006.01)
(52) U.S. Cl.
USPC .......................................... 711/122; 711/117
(58) Field of Classification Search
None
See application file for complete search history.

(56) References Cited

U.S. PATENT DOCUMENTS

| | | | |
|---|---|---|---|
| 2005/0246487 A1 | 11/2005 | Ergan et al. | |
| 2007/0204100 A1* | 8/2007 | Shin et al. | 711/103 |
| 2011/0119569 A1* | 5/2011 | Lee | 714/807 |
| 2012/0173824 A1* | 7/2012 | Iyigun et al. | 711/144 |

FOREIGN PATENT DOCUMENTS

| | | |
|---|---|---|
| CN | 101470645 A | 7/2009 |
| CN | 102012849 A | 4/2011 |
| CN | 102043727 A | 5/2011 |

OTHER PUBLICATIONS

International Search Report and Written Opinion of the International Searching Authority in corresponding International Patent Application No. PCT/CN2012/075852 (Sep. 13, 2012).

* cited by examiner

*Primary Examiner* — Than Nguyen
(74) *Attorney, Agent, or Firm* — Leydig, Voit & Mayer, Ltd.

(57) ABSTRACT

A method for recovering description information, or a method for caching data in a database, includes: judging whether a database is closed normally after the last operation; if the database is not closed normally, traversing each data block in a level-2 cache, where corresponding disk location information is saved in a header of each data block; obtaining a data block in a disk according to the disk location information; and when the obtained data block in the disk is the same as a corresponding data block in the level-2 cache, establishing description information according to location information of the data block in the disk and location information of the data block in the level-2 cache, where the description information is used to describe correspondence between the location information of data in the disk and the location information of data in the level-2 cache.

8 Claims, 3 Drawing Sheets

METHOD AND DEVICE FOR RECOVERING DESCRIPTION INFORMATION, AND METHOD AND DEVICE FOR CACHING DATA IN DATABASE

CROSS-REFERENCE TO RELATED APPLICATIONS

This application is a continuation of International Patent Application No. PCT/CN2012/075852, filed on May 22, 2012, which claims priority to Chinese Patent Application No. 201110433019.1, filed on Dec. 21, 2011, both of which are hereby incorporated by reference in their entireties.

FIELD OF THE APPLICATION

The present application relates to the field of data storage technologies, and in particular, to a method and a device for recovering description information, and a method and a device for caching data in a database.

BACKGROUND OF THE APPLICATION

At present, in a database, a high-speed storage device, for example, a solid state disk (Solid State Disk, SSD) is generally used as a level-2 cache of a main memory. The high-speed storage device may also be called a non-volatile cache. One manner for the database to manage the level-2 cache is to read the cache, which means that non-dirty data in the main memory is placed in the level-2 cache. The data placed in the level-2 cache is called warm data. In order to increase query efficiency, information may be saved in the main memory. The description information is used to describe a correspondence between a location in a disk and a location in the level-2 cache of data. Through the description information, the data may be read into the main memory again directly from the level-2 cache and does not need to be read from the disk. When the database is restarted, because the information in the main memory is lost, the description information needs to be re-established.

In the prior art, when the database is restarted, the originally saved data in the level-2 cache of the database are all lost. Data needs to be preheated again. That is, a data block needs to be read from the disk to the main memory again, transferred from the main memory to the level-2 cache, and description information needs to be established in the main memory again. Such process of reading data and establishing description information again in the prior art takes a long time.

SUMMARY OF THE APPLICATION

Embodiments of the present application provide a method and a device for recovering description information, and a method and a device for caching data in a database, thereby reducing time required for recovering the description information.

An embodiment of the present application provides a method for recovering description information in a database, including:

judging whether the database is closed normally after last operation; and if the database is not closed normally, traversing each data block in a level-2 cache, where corresponding disk location information is saved in a header of each data block; obtaining a data block in a disk according to the disk location information; and when the obtained data block in the disk is the same as a corresponding data block in the level-2 cache, establishing description information according to location information of the data block in the disk and location information of the data block in the level-2 cache, where the description information is used to describe correspondence between the location information of data in the disk and the location information of data in the level-2 cache.

An embodiment of the present application provides a method for caching data in a database, including:

reading a data block from a disk to a main memory, and recording location information of the data block in the disk;

transferring the data block from the main memory to a level-2 cache, and saving, in a header of the data block, the location information of the data block in the disk; and saving, in description information, correspondence between the location information of the data block in the disk and the location information of the data block in the level-2 cache.

An embodiment of the present application provides a device for recovering description information in a database, including:

a judging unit, configured to judge whether the database is closed normally after last operation; and a processing unit, configured to, when the judging unit judges that the database is not closed normally, traverse each data block in a level-2 cache, where corresponding disk location information is saved in a header of each data block; obtain a data block in a disk according to the disk location information; and when the obtained data block in the disk is the same as a corresponding data block in the level-2 cache, establish description information according to location information of the data block in the disk and location information of the data block in the level-2 cache, where the description information is used to describe correspondence between the location information of data in the disk and the location information of data in the level-2 cache.

An embodiment of the present application provides a device for caching data in a database, including:

a reading unit, configured to read a data block from a disk to a main memory, and record location information of the data block in the disk;

a transferring unit, configured to transfer the data block from the main memory to a level-2 cache, and save, in a header of the data block, the location information of the data block in the disk; and a recording unit, configured to save, in description information, correspondence between the location information of the data block in the disk and the location information of the data block in the level-2 cache.

It can be known from the foregoing technical solutions that, in the embodiments of the present application, by saving the corresponding disk location information in the header of the data block in the level-2 cache, the description information may be established directly according to the disk location information in the header and the location information of the data block in the level-2 cache, and it is not required to again read data, transfer the data, and establish, according to a transfer process, the description information. Therefore, rapid re-establishment of the description information can be implemented, and time for recovering the description information is reduced.

BRIEF DESCRIPTION OF THE DRAWINGS

To illustrate technical solutions in embodiments of the present application more clearly, accompanying drawings to be used for describing the embodiments are introduced briefly in the following. Apparently, the accompanying drawings in the following description are only some embodiments of the present application, and persons of ordinary skill in the art can derive other drawings from the accompanying drawings without creative efforts.

DETAILED DESCRIPTION OF THE EMBODIMENTS

To make objectives, technical solutions, and advantages of embodiments of the present application clearer, the technical solutions in the embodiments of the present application are hereinafter described clearly and completely with reference to accompanying drawings. Evidently, the described embodiments are only some rather than all of the embodiments of the present application. Based on the embodiments of the present application, all other embodiments obtained by persons of ordinary skill in the art without creative efforts fall within the protection scope of the present application.

An open-source database of PostgreSql (hereinafter abbreviated as PG) is taken as an example. Description information in the PG is specifically a Hash table.

After data blocks are read from a disk to a main memory, due to space limitations of the main memory, some data blocks may be transferred to a level-2 cache. After the data blocks are transferred to the level-2 cache, the Hash table, used to record correspondence between location information of the data blocks in the disk and location information of the data blocks in the level-2 cache, may be saved in a management module of the database. For example, after the management module reads a data block at a location A of the disk to a main memory, if the data block is transferred to a location B of the level-2 cache, correspondence between A and B is saved in the Hash table.

In this way, after a data request sent by a data access module in the database indicates a need to read the data block at the location A, the management module may read the data block from the level-2 cache to the main memory according to the Hash table, and does not need to read the data block from the disk again, so as to increase query efficiency.

In addition, the data that is read again from the level-2 cache according to the Hash table refers to non-dirty data that is transferred from the main memory to the level-2 cache. That is, after being read from the disk to the main memory, the data is transferred to the level-2 cache without being changed in the main memory, so that consistency between the data in the disk and the data in the level-2 cache can be ensured.

After the database is restarted after being closed or breaking down, generally the main memory directly discards previously cached data. In order to increase the query efficiency, data may be read directly from the level-2 cache and does not need to be read from the disk. Moreover, in order to read the data directly from the level-2 cache, the Hash table needs to be recovered first.

Figure 1:
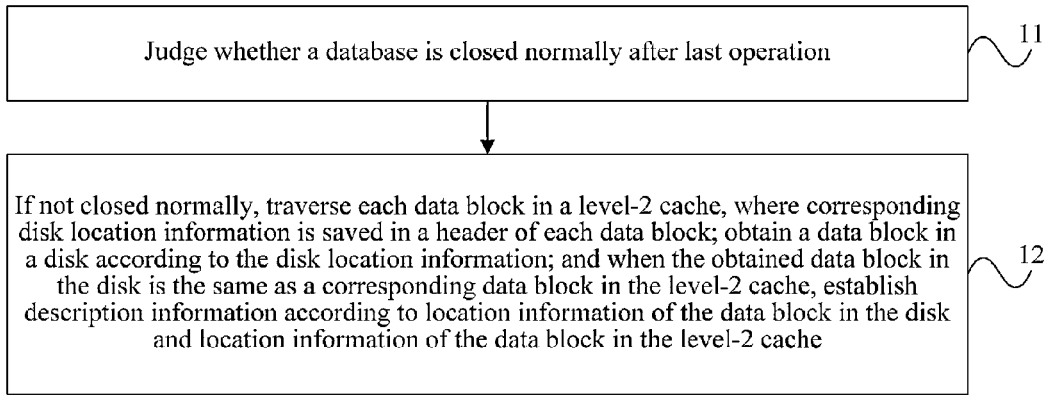
FIG. 1 is a schematic flow chart of an embodiment of a method for recovering description information in a database according to the present application.

FIG. 1 is a schematic flow chart of an embodiment of a method for recovering description information in a database according to the present application, which includes:

Step 11: Judge whether the database is closed normally after last operation.

After being restarted, the database may determine, according to a database log, whether it is closed normally or abnormally after the last operation.

Step 12: If the database is not closed normally, traverse each data block in a level-2 cache, where corresponding disk location information is saved in a header of each data block; obtain a data block in a disk according to the disk location information; and when the obtained data block in the disk is the same as a corresponding data block in the level-2 cache, establish description information according to location information of the data block in the disk and location information of the data block in the level-2 cache, where the description information is used to describe correspondence between location information of data in the disk and location information of data in the level-2 cache.

For example, when scanning a location B of the level-2 cache, a data block at the location B is obtained. Assuming that a header of the data block contains a location A of the disk, a data block at the location A is obtained. Subsequently, the data block at the location A and the data block at the location B are compared. If the two are the same, correspondence between A and B is established and saved in description information. With respect to data blocks at other locations, the same principle is used for processing, to obtain correspondence between location information of each data block in the disk and location information of each data block in the level-2 cache, so as to obtain description information. In addition, when the two are different, recovery of the correspondence of the data blocks may be discarded.

Figure 2:
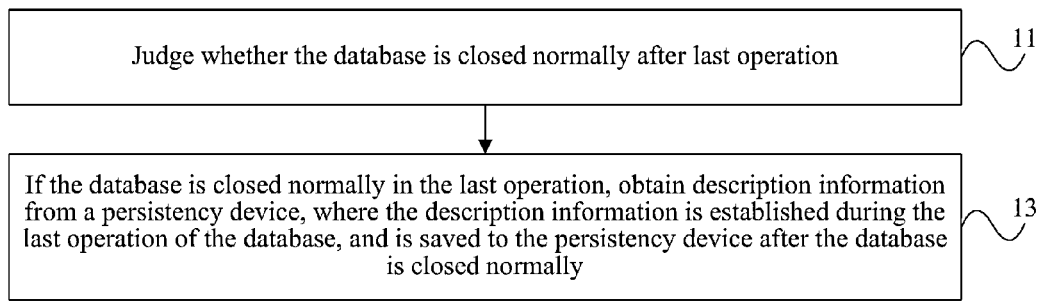
FIG. 2 is a schematic flow chart of another embodiment of a method for recovering description information in a database according to the present application.

In another aspect, referring to FIG. 2, the method further includes step 13: If the database is closed normally in the last operation, obtain description information from a persistency device, where the description information is established during the last operation of the database, and is saved to the persistency device after the database is closed normally.

After the database is closed normally, the description information from the database is saved in the persistency device, where the persistency device may be, for example, a disk or a non-volatile cache. This process is called a serialization process. After the database is restarted, the database obtains the description information from the persistency device. This process is called a deserialization process.

Further, because there may also be description information during an original operation process of the database, the establishing the description information as shown in FIG. 1, or the obtaining the description information from the persistency device as shown in FIG. 2, can be understood as the recovery of the description information of the last operation. After the description information is recovered, the database may directly read data from the level-2 cache to the main memory, and does not need to read from the disk again. For example, when a data request sent by a data access module indicates obtaining data at the location A of the disk, a management module determines, according to obtained description information, that the data at the location A of the disk have already been saved to the location B of the level-2 cache, and the data may be obtained directly from the location B of the level-2 cache and then sent to the main memory.

In the prior art, after a database is restarted, data needs to be preheated first, and then description information is established according to location information of the data during the preheating process, and then the data in a level-2 cache can be used according to the description information. A preheating process is that data is read from a disk to a main memory, and then read from the main memory to the level-2 cache. This preheating process needs to take a long time.

However, the foregoing manner of recovering description information according to information in a header of a data block in this embodiment may greatly reduce required time, so that the data in the level-2 cache can be applied rapidly according to the description information.

In this embodiment, by saving the corresponding disk location information in the header of the data block in the level-2 cache, the description information may be established directly according to the disk location information in the header and the location information of the data block itself in the level-2 cache, and it is not required to again read data, transfer the data, and establish, according to a transfer process, the description information. That is to say, in this embodiment, rapid re-establishment of description information can be implemented without a long preheating process, which reduces time for recovering the description information.

Figure 3:
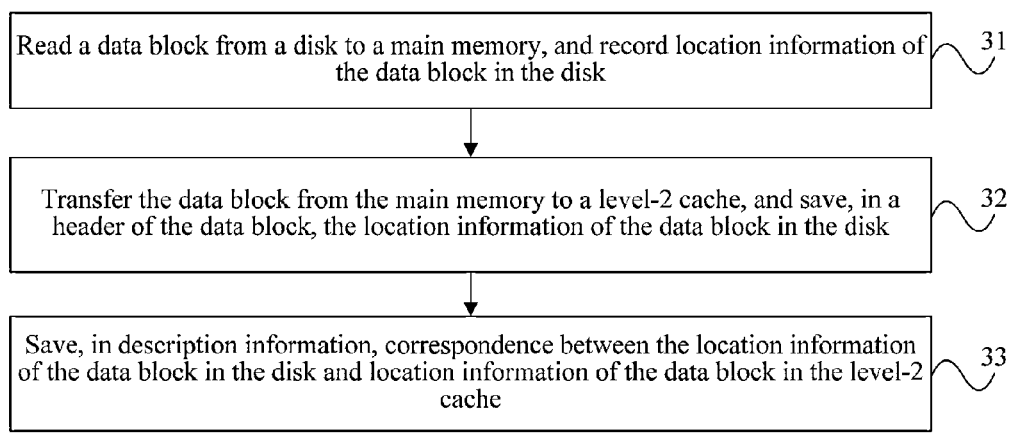
FIG. 3 is a schematic flow chart of an embodiment of a method for caching data in a database according to the present application.

FIG. 3 is a schematic flow chart of an embodiment of a method for caching data in a database according to the present application, which includes:

Step 31: Read a data block from a disk to a main memory, and record location information of the data block in the disk.

Step 32: Transfer the data block from the main memory to a level-2 cache, and save, in a header of the data block, the location information of the data block in the disk.

Figure 4:
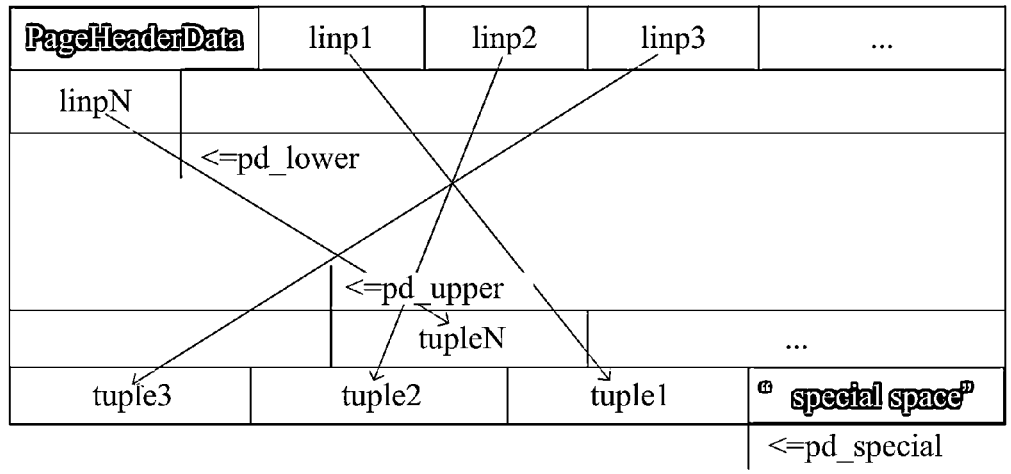
FIG. 4 is a schematic diagram of a data block in a level-2 cache according to the present application.

Specifically, with respect to data that is transferred to the level-2 cache, reference may be made to FIG. 4 for its structure, which includes a data header (PageHeaderData), subsequent pointers (linp1, linp2, . . . ), stored content (tuple1, tuple2, . . . ), index information (special space), and so on. The difference from the structure of existing data is that, in the embodiment of the present application, the data header includes corresponding location information in a disk. The description of the data header may be:

typedef struct PageHeaderData
{
XLogRecPtr pd_lsn; /*LSN: point to a location of a page change record in a last xlog*/ . . . /*not list all fields*/
uint16 pd_pagesize_version;
TransactionId pd_prune_xid; /*oldest prunable XID, or zero if none*/
ItemIdData pd_linp[1]; /*record a start location of a Linp array*/
RelFileNode mode; /*newly added field, used to save a relationship in the block for recovering*/
} PageHeaderData;
typedef PageHeaderData *PageHeader;

In the foregoing description, "RelFileNode mode" is a newly added field, used to save the corresponding location information in the disk. For example, data at a location B in the level-2 cache is read from a location A of the disk and transferred to the level-2 cache by the main memory, and information of the location A is saved in a "RelFileNode mode" field in a data header portion of the data at the location B.

Step 33: Save, in description information, correspondence between the location information of the data block in the disk and location information of the data block in the level-2 cache.

Subsequently, during recovery, if the database is closed abnormally, recovery of the description information may be performed as the content shown in FIG. 1 according to header content of the data block.

Figure 5:
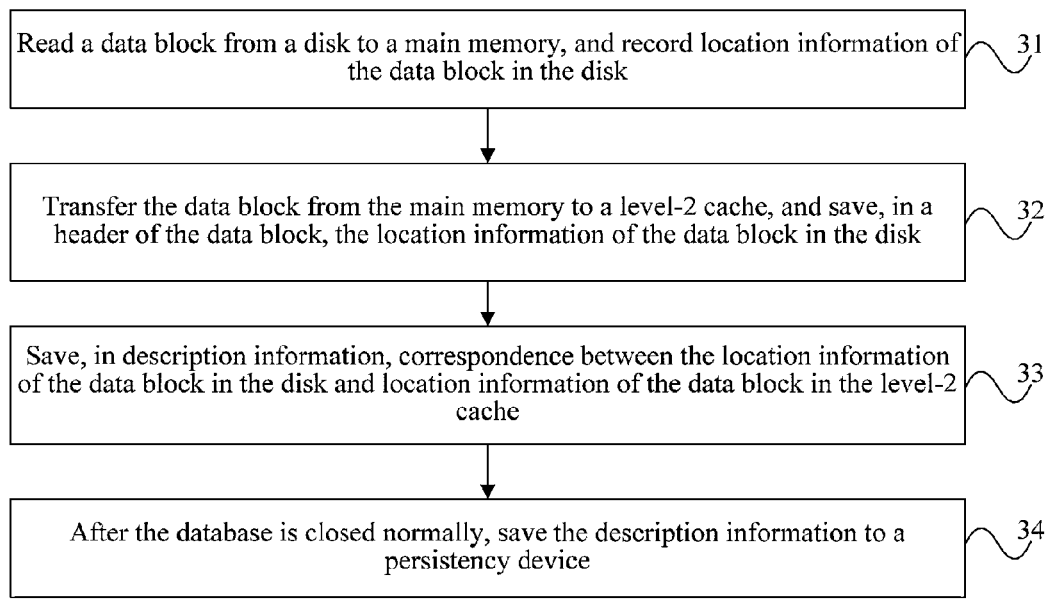
FIG. 5 is a schematic flow chart of another embodiment of a method for caching data in a database according to the present application.

Further, referring to FIG. 5, after step 33, the method further includes:

Step 34: After the database is closed normally, save the description information to a persistency device.

Subsequently, during recovery, the description information may be recovered directly from the persistency device.

Certainly, during an operation process of the database, data may also be obtained from the level-2 cache according to the description information. That is, the following steps may also be performed during the operation process of the database.

After receiving a data request sent by a data access module, a management module determines, according to the description information and according to location information that is carried in the data request and is of to-be-obtained data in the disk, location information of the to-be-obtained data in the level-2 cache, obtains the data from the level-2 cache according to the location information of the to-be-obtained data in the level-2 cache, and then sends the data to the main memory.

Certainly, if the management module does not obtain, by querying the description information, the location information that is of the to-be-obtained data in the level-2 cache and corresponds to the location information of the to-be-obtained data in the disk, the data is read from a corresponding location in the disk and then sent to the main memory.

In this embodiment, after the database is restarted, the data may be recovered in the level-2 cache, which avoids a long preheating process. Corresponding location information in the disk is added to a data header of the data block, and original discrete data is organized by using a description information process, to provide a basis for the recovery of the description information. Therefore, during the recovery of the description information, a read speed can be increased and a pre-read policy can be used, and so on.

Figure 6:
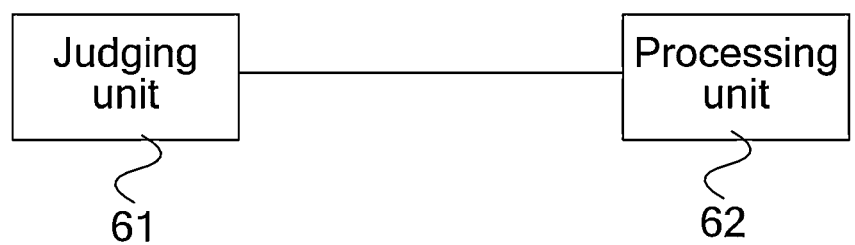
FIG. 6 is a schematic structural diagram of an embodiment of a device for recovering description information in a database according to the present application.

FIG. 6 is a schematic structural diagram of an embodiment of a device for recovering description information in a database according to the present application. The device may specifically be a management module in a database. The device includes a judging unit 61 and a processing unit 62. The judging unit 61 is configured to judge whether a database is closed normally after last operation. The processing unit 62 is configured to, when the judging unit judges that the database is not closed normally, traverse each data block in a level-2 cache, where corresponding disk location information is saved in a header of each data block; obtain a data block in the disk according to the disk location information; and when the obtained data block in the disk is the same as a corresponding data block in the level-2 cache, establish description information according to location information of the data block in the disk and location information of the data block in the level-2 cache, where the description information is used to describe correspondence between location information of data in the disk and location information of data in the level-2 cache.

Optionally, the processing unit 62 is further configured to, when the judging unit judges that the database is closed normally, obtain description information from a persistency device, where the description information is established during the last operation of the database, and is saved to the persistency device after the database is closed normally.

Optionally, the device further includes: a first recording unit, configured to, during the last operation, read the data block from the disk to a main memory, and record the location information of the data block in the disk; transfer the data block from the main memory to the level-2 cache, and save, in the header of the data block, the location information of the data block in the disk; and save, in the description information, correspondence between the location information of the data block in the disk and the location information of the data block in the level-2 cache.

Optionally, the device further includes: a second recording unit, configured to, during the last operation, read the data block from the disk to a main memory, and record the location information of the data block in the disk; transfer the data block from the main memory to the level-2 cache, and save, in the header of the data block, the location information of the data block in the disk; save, in the description information, the correspondence between the location information of the data block in the disk and the location information of the data block in the level-2 cache; and after the database is closed normally in the last operation, save the description information to the persistency device.

In this embodiment, by saving the corresponding disk location information to the header of the data block in the level-2 cache, description information may be established directly according to the disk location information in the header and the location information of the data block in the level-2 cache, and it is not required to again read data, transfer the data, and establish, according to a transfer process, the description information. Therefore, rapid re-establishment of description information can be implemented without a long preheating time, and time for recovery is reduced.

Figure 7:
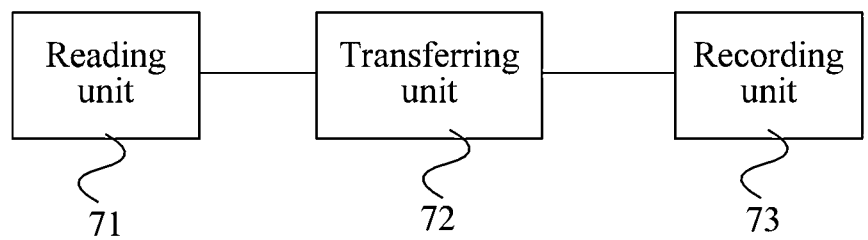
FIG. 7 is a schematic structural diagram of an embodiment of a device for caching data in a database according to the present application.

FIG. 7 is a schematic structural diagram of an embodiment of a device for caching data in a database according to the present application. The device may specifically be a management module in a database. The device includes a reading unit 71, a transferring unit 72, and a recording unit 73. The reading unit 71 is configured to read a data block from a disk to a main memory, and record location information of the data block in the disk. The transferring unit 72 is configured to transfer the data block from the main memory to a level-2 cache, and save, in a header of the data block, the location information of the data block in the disk. The recording unit 73 is configured to save, in the description information, correspondence between the location information of the data block in the disk and location information of the data block in the level-2 cache.

Optionally, the recording unit is further configured to, after the database is closed normally, save the description information to a persistency device.

In this embodiment, after the database is restarted, data may be recovered in the level-2 cache, which avoids a long preheating process. Corresponding location information in the disk is added to a data header of a data block, and the original discrete data is organized by using a description information process, to provide a basis for recovery of description information. Therefore, during the recovery of the description information, a read speed can be increased and a pre-read policy can be used, and so on.

Persons of ordinary skill in the art can understand that all or part of the steps of the foregoing method embodiments may be implemented by a program instructing relevant hardware. The program may be stored in a computer readable storage medium. When the program runs, t the steps of the foregoing method embodiments are performed. The storage medium includes various media capable of storing program codes, such as a ROM, a RAM, a magnetic disk, or an optical disk.

Finally, it should be noted that the foregoing embodiments are merely used to illustrate the technical solutions of the present application, but not intended to limit the present application. Although the present application has been described in detail with reference to the foregoing embodiments, persons of ordinary skill in the art should understand that they still can make modifications to the technical solutions recorded in the foregoing embodiments, or equivalent replacements to some technical features in the technical solutions, and such modifications or replacements do not cause the essence of corresponding technical solutions to depart from the scope of the technical solutions of the embodiments of the present application.

What is claimed is:

1. A method for recovering description information in a database, comprising:
   judging whether the database is closed normally after last operation; and
   if the database is not closed normally,
   traversing each data block in a level-2 cache, wherein corresponding disk location information is saved in a header of each data block;
   obtaining a data block in a disk according to the disk location information; and
   when the obtained data block in the disk is the same as a corresponding data block in the level-2 cache, establishing description information according to location information of the data block in the disk and location information of the data block in the level-2 cache, wherein the description information is used to describe correspondence between the location information of data in the disk and the location information of data in the level-2 cache.

2. The method according to claim 1, further comprising:
   if the database closed normally, obtaining description information from a persistency device, wherein the description information is established during the last operation of the database and is saved to the persistency device after the database is closed normally.

3. The method according to claim 1, further comprising:
   during a last operation of the database, reading the data block from the disk to a main memory and recording the location information of the data block in the disk;
   transferring the data block from the main memory to the level-2 cache and saving, in a header of the data block, the location information of the data block in the disk; and
   saving, in the description information, correspondence between the location information of the data block in the disk and the location information of the data block in the level-2 cache.

4. The method according to claim 2, further comprising:
   during the last operation of the database, reading the data block from the disk to the main memory and recording the location information of the data block in the disk;
   transferring the data block from the main memory to the level-2 cache and saving, in a header of the data block, the location information of the data block in the disk;
   saving, in the description information, correspondence between the location information of the data block in the disk and the location information of the data block in the level-2 cache; and
   after the database is closed normally in the last operation of the database, saving the description information to the persistency device.

5. A device for recovering description information in a database, comprising:
- a judging unit, configured to judge whether the database is closed normally after last operation; and
- a processing unit, configured to, when the judging unit judges that the database is not closed normally,
- traverse each data block in a level-2 cache, wherein corresponding disk location information is saved in a header of each data block;
- obtain a data block in a disk according to the disk location information; and
- when the obtained data block in the disk is the same as a corresponding data block in the level-2 cache, establish description information according to location information of the data block in the disk and location information of the data block in the level-2 cache, wherein the description information is used to describe correspondence between the location information of data in the disk and the location information of data in the level-2 cache.

6. The device according to claim 5, wherein the processing unit is further configured to:
- when the judging unit judges that the database is closed normally, obtain description information from a persistency device, wherein the description information is established during the last operation of the database, and is saved to the persistency device after the database is closed normally.

7. The device according to claim 5, further comprising:
a first recording unit, configured to:
- during the last operation, read the data block from the disk to a main memory and record the location information of the data block in the disk;
- transfer the data block from the main memory to the level-2 cache and save, in a header of the data block, the location information of the data block in the disk; and
- save, in the description information, correspondence between the location information of the data block in the disk and the location information of the data block in the level-2 cache.

8. The device according to claim 6, further comprising:
a second recording unit, configured to:
- during the last operation, read the data block from the disk to a main memory and record the location information of the data block in the disk;
- transfer the data block from the main memory to the level-2 cache and save, in a header of the data block, the location information of the data block in the disk;
- save, in the description information, correspondence between the location information of the data block in the disk and the location information of the data block in the level-2 cache; and
- after the database is closed normally in the last operation, save the description information to the persistency device.

* * * * *